(12) United States Patent
Soos

(10) Patent No.: US 8,862,325 B2
(45) Date of Patent: Oct. 14, 2014

(54) METHOD FOR CONTROLLING A STEERING APPARATUS

(75) Inventor: Istvan Soos, Budapest (HU)

(73) Assignee: ThyssenKrupp Presta AG, Eschen (LI)

( * ) Notice: Subject to any disclaimer, the term of this patent is extended or adjusted under 35 U.S.C. 154(b) by 170 days.

(21) Appl. No.: 13/639,299

(22) PCT Filed: Dec. 22, 2010

(86) PCT No.: PCT/EP2010/007859
§ 371 (c)(1),
(2), (4) Date: Oct. 4, 2012

(87) PCT Pub. No.: WO2011/134485
PCT Pub. Date: Nov. 3, 2011

(65) Prior Publication Data
US 2013/0030653 A1    Jan. 31, 2013

(30) Foreign Application Priority Data

Apr. 27, 2010 (EP) .................................. 10004434

(51) Int. Cl.
*B62D 5/04* (2006.01)
*B62D 15/02* (2006.01)

(52) U.S. Cl.
CPC .......... *B62D 5/0424* (2013.01); *B62D 15/0235* (2013.01); *B62D 5/0481* (2013.01)
USPC ............ 701/41; 701/34.4; 701/31.7; 180/444

(58) Field of Classification Search
None
See application file for complete search history.

(56) References Cited

U.S. PATENT DOCUMENTS 4,719,445 A * 1/1988 Fremd ........................... 340/438
6,764,421 B2   7/2004 Onogi (Continued)

FOREIGN PATENT DOCUMENTS

| DE | 10 2005 051 220 A1 | 5/2007 |
|----|---------------------|--------|
| DE | 102008050248 A1    | 4/2009 |
| DE | 102008021849 A1    | 11/2009 |

OTHER PUBLICATIONS

International Search Report issued in International Application No. PCT/EP2010/007859 dated Apr. 20, 2011.

(Continued)

*Primary Examiner* — Michael J Zanelli
(74) *Attorney, Agent, or Firm* — Panitch Schwarze Belisario & Nadel LLP

(57) ABSTRACT

The invention relates to a Method so control a steering apparatus comprising following steps:

(A) Checking at every time whether there is a straight run state of the vehicle or not;

(B) If the straight run state of vehicle is reached, determines the instantaneous rack position (R) and calculates a new offset as to a difference between the instantaneous rack position (R) and the first position (R0) of said rack (7);

(C) Checking in a first justify operation, whether the new offset of the rack position in the straight run state of vehicle to the first rack position differs to an old offset, which where determined as the new offset at an earlier time, and set in this case the first justify result as to true and otherwise as to false;

(D) Checking in a second justify operation, whether the pull situation value exceeds a threshold value and set in this case the second justify result as to true and otherwise as to false;

(E) If the first and second justify results are true, set a suspension device status as to a "suspension damaged" status;

(F) If the first justify result is true and the second justify result is false, set a belt jump status as to a "belt jumped" status.

10 Claims, 4 Drawing Sheets

(56) References Cited

U.S. PATENT DOCUMENTS

| | | | |
|---|---|---|---|
| 6,965,820 B2 * | 11/2005 | Amberkar et al. | 701/41 |
| 6,997,832 B2 | 2/2006 | Onogi | |
| 2007/0095603 A1 * | 5/2007 | Namgung et al. | 180/444 |
| 2008/0147276 A1 * | 6/2008 | Pattok et al. | 701/42 |

OTHER PUBLICATIONS

International Preliminary Report on Patentability and Written Opinion issued in PCT/EP2010/007859, issued Oct. 30, 2012.

* cited by examiner

METHOD FOR CONTROLLING A STEERING APPARATUS

CROSS-REFERENCE TO RELATED APPLICATIONS

This Application is a National Stage of PCT International Application No. PCT/EP2010/007859, filed on Dec. 22, 2010, and claims priority of German Patent Application No. 10004434.6, filed on Apr. 27, 2010. The disclosures of the aforementioned applications are incorporated herein in their entirety by reference.

FIELD AND BACKGROUND

The present invention relates to a method for controlling a steering apparatus.

The closest prior art is disclosed in German Patent Application DE 10 2008 021 849 A1. This document shows a steering device for a road vehicle which is servo-assisted by electric motor driving a steering rack via a belt drive. The device comprises a number of sensors, namely a steering angle sensor which is associated with the steering wheel and a motor position sensor which detects the position of the rotor of the electric motor. The system continuously checks the relationship between the motor position and the steering angle. Among other features, a belt lump detection is provided which detects a sudden offset in the correlation between the steering angle and the motor position. Such an offset can occur in the case of belt driven electromechanical steering systems if the belt is a toothed belt and due to an overload situation, the belt slips on the belt gear and jumps from one to another. The prior art system will in this case assume that the belt has been damaged and the steering operates in a mode which prevents further damage to the belt, namely by reducing the servo-assistance.

While the prior art steering systems provide the driver with an information that the belt may be damaged and has to be checked, there is no information whether or not the mechanical components of the steering linkage (tie rods etc.) and the suspension have been damaged. The prior art systems do not monitor the center position of the steering system and the actual position of the steering rack while driving straight ahead.

It is therefore am object of the present invention to provide a method for controlling an electromechanical steering system which comprises a further detection of possible damages to the steering system and to the suspension.

SUMMARY OF THE DISCLOSURE

In the system, which comprises steering power support apparatus for a motor vehicle with at least one steerable road wheel and a suspension, furthermore comprising:
a steering shaft with an input means for demanding a direction of driving the vehicle, for example an adopted steering wheel,
sensing means detecting the demand, for example the torque and/or the rotation angle, introduced in said steering shaft,
a rack, wherein said rack is adjustable in its longitudinal direction to different positions, on basis of the demand introduced into the steering shaft, whereby said at least one road wheel is turning, whereby the steering apparatus is designed so that in a first position R0 of said rack, said at least one road wheel is turned in a straight run direction which is designed to steer the vehicle in a straight run direction, wherein the steering power support means supports the adjusting of the rack by a belt drive with a belt and belt gears,
and a control device controlling said power support means,
means to determine said instantaneous position R of the rack, which where either directly measured or calculated by a state observer, the following features are additionally provided:
a device for determining a pull situation value of the steering device, in which a pull in any direction occurs while the vehicle is driving straight ahead, either directly measured or calculated by an appropriate algorithm and/or a state observer,
and a device to determine a straight run state of the vehicle.

In this system, the following steps are carried out to determine a belt jump situation and a suspension damage, and especially to distinguish between these two situations:
(A) Continuously or quasi-continuously checking whether or not there is a straight run state of the vehicle;
(B) If the straight run state of vehicle is reached, determine the instantaneous rack position (R) and calculates a new offset as to a difference between the instantaneous rack position (R) and the first position (R0) of said rack;
(C) Checking in a first justify operation, whether the new offset of the rack position in the straight run state of vehicle to the first rack position differs from an old offset, which was previously determined as new offset, and in this case set the first justify result as to true and otherwise as to false;
(D) Checking in a second justify operation, whether the pull situation value exceeds a threshold value and, if yes, set the second justify result as to true and otherwise as to false;
(E) If the first and second justify result are true, set a suspension device status as to a damaged state,
(F) If the first justify result is true and the second justify result is false, set a belt jump status as to a belt jump state.

The damage status and the "belt jumped" status can be handled as flags in the control program of the device.

In this steering apparatus, the first or default center position of said rack, which position is called R0 in the following, is designed or constructed such that the road wheel or the road wheels are turned in a straight run direction which is designed to steer the vehicle straight ahead. In the case of two steerable road wheels, this position R0 usually is achieved when both wheels are directed straight ahead, possibly with a symmetric toe-in on both sides. A pull situation which is for example due to cross wind, is then characterized by the vehicle driving straight ahead while the steering device is not exactly in position R0 because the driver has to introduce steering effort to compensate the pull manually by introducing a steering torque via the hand wheel.

This method enables the steering system not only to check for the correlation between the steering wheel angle and the motor position, but also between the steering wheel angle and the driving direction of the vehicle. In this way, an offset between the vehicle direction, especially in straight ahead driving and the steering wheel angle can be detected and by additionally looking for a pull in any direction during straight ahead driving it can be distinguished between a "belt jump" and a "suspension damage".

In a preferred embodiment, the device to determine any pull situation comprises a device to determine the instantaneous rack lead (FR) in its longitudinal direction, which is introduced by said steerable road wheel and wherein the instantaneous rack load (FR) is used as the pull state value. Thus, a direct determination of the relevant force is possible.

It is furthermore preferred that the power support means is an electric motor with a rotor and that the means to determine said instantaneous position (R) of the rack uses a sensor for sensing the angular position of the rotor of the power support means. This sensor produces a signal representative of the motor position and the position of the steering gear with a very fine resolution.

In a preferred embodiment, it is provided that the result of the determination of the offset is used to correct the offset for further operation of the steering system, in case that the belt has jumped. Furthermore, if the "belt jumped" status is true, a new motor position is associated with the straight ahead driving condition as a new central position. These features enable the device to operate normally after a belt jump has occurred. In principal, the belt jump does not harm any of the components so that the normal operation can be carried out with the new parameters. However, the belt itself may he damaged. In this case, it is preferred that, a warning message is generated and issued to the driver if the "belt jumped" status is true. Such, a warning message can be the instruction to the driver to have the steering system checked as soon as possible.

In another embodiment, the suspension damage, which may have been detected, can be regarded in the control program of the steering device and/or in a control program for the vehicle. These control programs can operate in a modified way to minimize the load on the suspension, for example by limiting the vehicle speed or by reducing the servo assist force. In this way, in certain cases a pre-damaged suspension can be prevented from failing.

It is also preferred-that a warning message is generated and issued if the "suspension damage" status is true. This warning message can include the instruction to stop the vehicle immediately or to have the suspension checked as soon as possible.

It is preferred that the warning messages as mentioned above are stored in a memory for later evaluation of the underlying problem in a garage.

BRIEF DESCRIPTION OF THE DRAWINGS

In the following, preferred embodiments of the invention are described with reference to the drawings, which show.

DETAILED DESCRIPTION OF VARIOUS EMBODIMENTS

Figure 1:
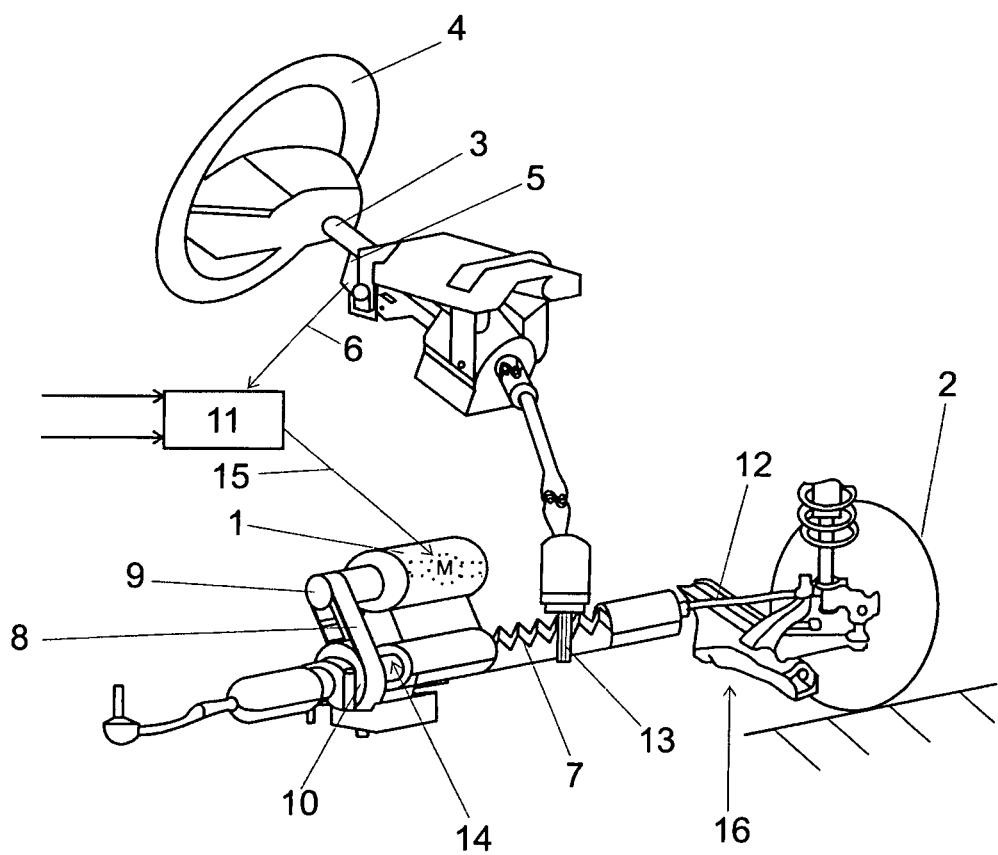
FIG. 1: a schematic representation of an electro-mechanic steering system.

FIG. 1 shows schematically a steering device according a first embodiment applicable to the invention. The steering device comprises a steering shaft 3 and a steering hand wheel 4 which is adopt to a first end of the steering shaft 3. The road wheel 2 is adjustable by a tie rod 12. The tie rod 12 is driven by a rack 7. A pinion 13 meshes with the rack 7 and, by rotating the pinion 13, the rack 7 is driven in longitudinal direction. The pinion 13. is driven by rotating the hand wheel 4 wherein the rotating torque is transmitted by the steering shaft 3. By this rotation is introduced the demand 6 into the steering shaft 3. The steering device comprises further a power support mean 1 to introduce a support torque in to the steering actuator. A power support means 7 should be in an embodiment arranged to act in longitudinal direction to the rack 7. Such power support means are well known and can use an electric motor, which is coupled over a belt drive 8, 9, 10, to a hall screw mechanism 14 to drive the rack 7 in longitudinal direction, supporting the driver. The belt drive comprises a belt 8 and a first belt gear 9 coupled to the rotor of the electric motor and a second belt gear 10 coupled to the screw of the ball screw mechanism 14. The road wheel 2 is supported in the vehicle (not shown) via a suspension 16.

A control device 11 gets signals (demand 6) from a torque sensor (sensing means 5) and other signals, for example the vehicle speed, and calculates supply power values 15 outputting them to the electric motor of the power support means 1 of the steering device. When the driver adjusts the steering wheel 4, he introduces a steering shaft torque into the steering device, which is measured by the steering torque sensor. Depending on the value of the steering torque signal and other parameters of the vehicle and perhaps of other parameters of the steering situation, the control device 11 calculates a power support moment to reduce the hand wheel torque for the driver.

Figure 2:
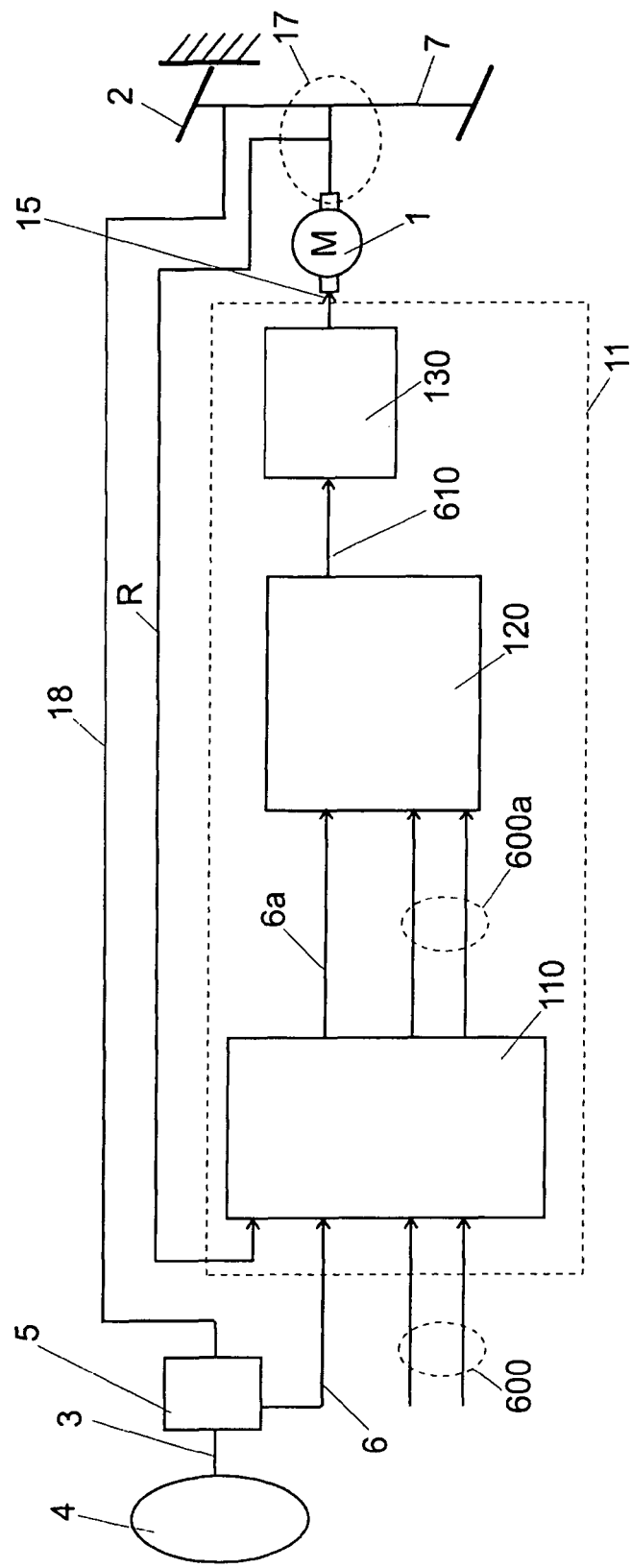
FIG. 2: a first embodiment of the control device for implementing the control method.

FIG. 2 shows a first embodiment of the control device and control method for the steering device with steering power support means. The steering demand 6, which is introduced by the steering hand wheel 4 and measured by the torque sensor 5, is output to an observer device 110, which calculates state parameters for the steering system or vehicle system on the basis of a steering device model or vehicle model. Further at least a transformed demand Value 6*a* is output to the observer device 110 of the steering control device. If there are further measured values like a vehicle acceleration and/or steering angle and/or steering angle speed and/or acceleration and/or other steering and/or vehicle values available, they will also fee fed into the observer device of the controlling device. In the observer device 110, many necessary or useful parameters of the vehicle and the steering system are calculated to improve the controlling of the steering support, means. On the basis of the steering shaft torque and other calculated and/or measured vehicle and/or steering parameters 600*a* the control device 120 calculates requested motor torque 610 and outputs them to the motor control device 130. The motor control device 130 outputs the motor current values to the coils of the motor 1. Usually such motor control device 130 works with a pulse width modulation (PWM), which is well known in the prior art. Other methods to control the electric motor 1 are also possible and applicable. The motor 1 outputs the torque to adjust the rack 7 in a longitudinal direction to turn the road wheels 2. Through a mechanical coupling 18, feedback information is transferred back into the steering shaft 1, thereby closing the feedback control circuit. Although this example shows a mechanical coupling 18, it is not necessary to have such mechanical coupling to use the invention. It would be possible and applicable to have a steer-by-wire steering device in which the coupling between the road wheel 2 and the steering wheel 4 is made by electric means only. The mechanical coupling 18 could be a steering shaft or another mechanical device like a hydraulic circuit or a Bowden cable. A sensing device 17 detects the instantaneous position R of the rack 7. In this example, the rotor position sensor in the motor 1 is used to determine the instantaneous position of the rack 7.

Figure 3:
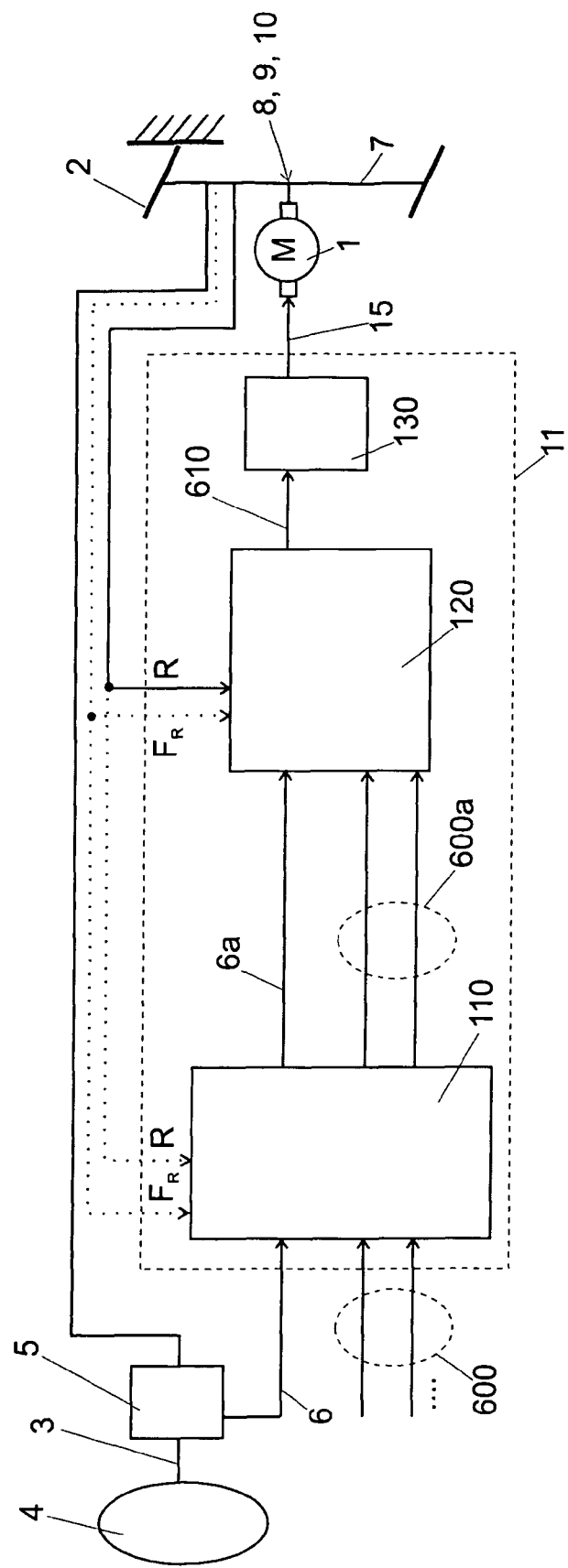
FIG. 3: a second embodiment of the control device for implementing the control method.

FIG. 3 shows another embodiment of the invention. Most components of the system of FIG. 3 are identical with those shown in FIG. 2. Those identical or similar items are designated with identical reference numbers.

The embodiment of FIG. 2 uses some additional optional signals, namely the rack load FR which may be measured by appropriate sensors directly or indirectly coupled to the steering rack 7. Possible types of sensors are force sensors which are located between the tie rods 12 and the steering rack 7.

These sensors can provide a signal directly representative of the axial force on the steering rack 7. Another type of sensor may be provided in the vicinity of a thrust element which urges the steering rack 7 in close contact with the pinion 13. The load on this thrust element is representative of the force, which is applied between the meshing teeth of the pinion 13 and the rack 7. A third type of sensor may pick up the axial force on the pinion 13 which arises from the inclination of the gears on the rack 7 and the pinion 13. Through this inclination, any force or load in axial direction of the steering rack 7 will lead to an axial force component on the pinion 13, which may be detected.

Through the use of these sensors, the axial force PR on steering rack 7 maybe detected and supplied so the control unit 11, either to the state observer 110 or to the controller 120, or those. Likewise, the signal R representing the position of the steering rack 7 can be provided to the controller 120 as shown in a solid line. Alternatively or additionally, the signal R can also be supplied to the observer 110 as indicated with a dotted line.

Figure 4:
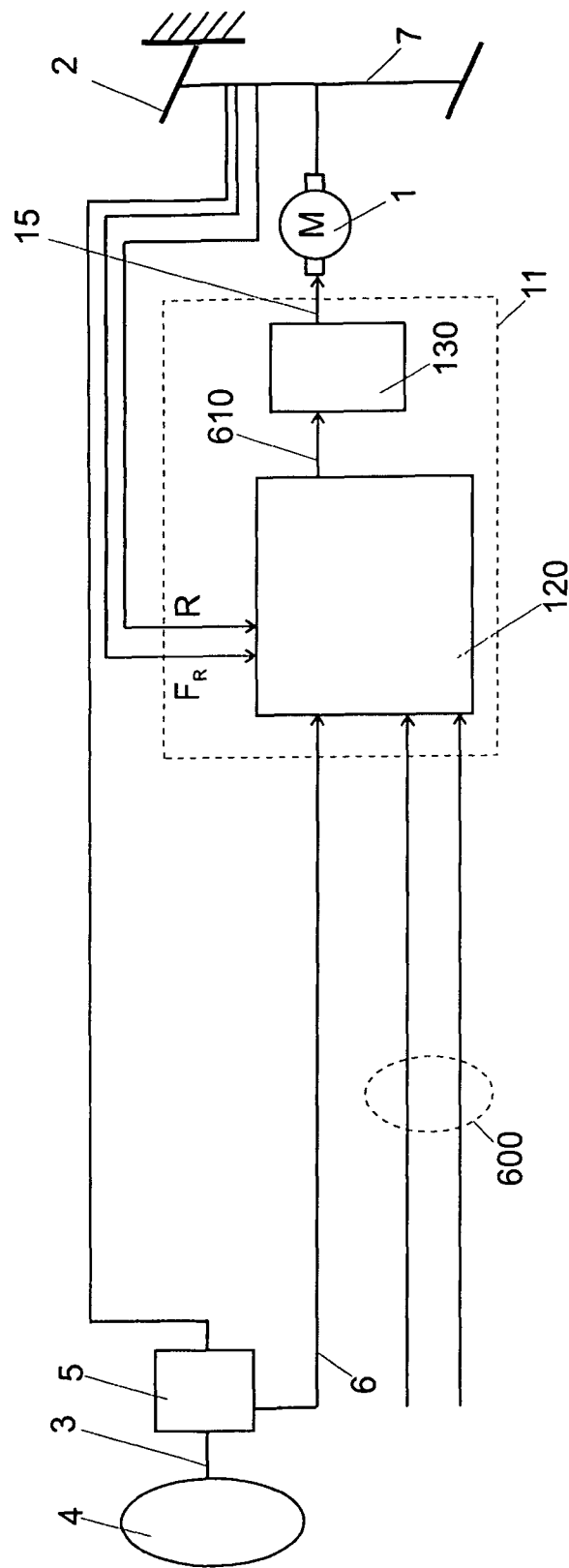
FIG. 4: a third embodiment of the control device for implementing the control method.

FIG. 4 shows a simplified embodiment of the present invention without the use of a state observer. Components, which are identical or similar to those of FIGS. 2 and 3, are designated with identical reference numerals.

In this embodiment, the torque demand 6 of the driver and other measured signals 600 like vehicle speed, vehicle acceleration and others are supplied directly to the controller 120. The signals representing the rack position R and rack force FR are also provided as input to the controller 120 since these signals are measured and not partially or completely estimated by an observer, the controller 120 can process these signals directly and derive the requested motor torque signals 610 which is then supplied to the motor controller 130.

In use, the steering system explained in the foregoing description of the embodiments continuously checks whether or not the vehicle is in a straight running condition, namely for example that there is no acceleration to the side of the vehicle, that the rotational speed of two wheels of the same axial is identical etc. Some straight running determining means are known in the prior Art and also applicable. Such signal should be included into the group measured signals 600. In this straight running state, the system checks the position of the steering wheel and the servo motor 1. If the position of the servo motor 1 does not match a pre-determined centre position, the control unit determines that a belt jump or a suspension damage may have occurred. In the next step, the control unit checks the presence or absence of a rack load, steering torque or another signal which is representative of the vehicle pulling to one side. If the vehicle is pulling to one side, the steering control unit assumes that the suspension has been damaged, for example by hard contact of one of the steered wheels 2 with a solid obstacle. Appropriate warning signals are then generated and stored in a memory. If no pull situation is detected, the steering control system assumes that a belt jump has occurred and that another motor position is now associated with the centre position of the steering gear. In this case the new motor position is stored as the default centre position of the motor for the further process. In addition, the steering system issues appropriate warnings and stores appropriate warning signals in the memory because the belt jump may toe due to a faulty belt or due to an overload situation, which may again have been caused by a hard contact of a steered wheel 2 with an obstacle. It may therefore be necessary to check and replace the belt 8.

What is claimed is:

1. A method to control a steering apparatus with a steering power support system for a motor vehicle with at least one steerable road wheel and a suspension, the steering apparatus including:
    a steering shaft with an input for a demand for a direction of driving the vehicle;
    at least one sensor configured to detect the demand introduced in said steering shaft,
    a rack, wherein said rack is adjustable in its longitudinal direction to different positions, based at least on the demand introduced into the steering shaft, whereby said at least one steerable road wheel is turning, whereby the steering apparatus is designed so that in a first position of said rack, said at least one steerable road wheel is turned in a straight run direction which is designed to steer the vehicle in a straight run direction, wherein the steering power support system supports the adjusting of the rack by a belt drive with a belt and a first belt gear and a second belt gear;
    a control device controlling said power support system,
    at least one sensing device configured to determine said instantaneous position of the rack, which is either directly measured or calculated by a state observer,
    a device for determining a pull situation value of the steering apparatus, in which a pull in any direction occurs while the vehicle is driving straight ahead, the value being either directly measured or calculated by an appropriate algorithm and/or a state observer, and
    a device to determine a straight run state of the vehicle, wherein the method comprises:
    (A) checking whether there is a straight run state of the vehicle or not;
    (B) if a straight run state of the vehicle is found, determining the instantaneous rack position and calculating a new offset between the instantaneous rack position and the first position of said rack;
    (C) performing a first justify operation to check whether the new offset of the rack position in the straight run state of the vehicle differs from an old offset, previously determined as the new offset at an earlier time, and if the new offset is different from the old offset, setting a first justify result to true, and otherwise setting the first justify result to false;
    (D) performing a second justify operation to check whether the pull situation value exceeds a threshold value, and if the pull situation value exceeds the threshold value, setting a second justify result to true, and otherwise setting the second justify result to false;
    (E) if the first and second justify results are true, setting a suspension device status to a "suspension damaged" state; and
    (F) if the first justify result is true and the second justify result is false, setting a belt jump status to a "belt jumped" state.

2. The method according to claim 1, wherein the device to determine a pull situation comprises a device to determine the instantaneous rack load in its longitudinal direction, which is introduced by said steerable road wheel, and wherein the instantaneous rack load is used as the pull state value.

3. The method according to claim 1, wherein the power support system is an electric motor with a rotor, and wherein the at least one sensing device configured to determine said instantaneous position of the rack uses a sensor for sensing the angular position of the rotor of the power support system.

4. The method according to claim 1, wherein the method further comprises: if the belt jumped status is in the "belt jumped" state, using the new offset to correct the offset for further operation of the steering device.

5. The method according to claim 1, wherein the method further comprises: if the belt jumped status is in the "belt jumped" state, associating a new motor position of a motor of the power support system with the straight ahead driving condition as a central position.

6. The method according to claim 1, wherein suspension damage can be regarded in a control program of the steering device and/or in a control program for the vehicle.

7. The method according to claim 1, further comprising: generating a warning message if the belt jumped status is in the "belt jumped" state.

8. The method according to claim 1, further comprising: generating a warning message if the suspension damage status is in the "suspension damage" state.

9. The method according to claim 7, further comprising storing the warning message in a memory for a later evaluation of an underlying problem.

10. The method according to claim 8, further comprising storing the warning message in a memory for a later evaluation of an underlying problem.

\* \* \* \* \*